United States Patent
Krishnan et al.

(10) Patent No.: US 6,656,369 B2
(45) Date of Patent: Dec. 2, 2003

(54) METHOD FOR FABRICATING A SCANNING PROBE MICROSCOPE PROBE

(75) Inventors: Mahadevaiyer Krishnan, Hopewell Junction, NY (US); Mark E. Lagus, Stanfordville, NY (US); Kevin S. Petrarca, Newburgh, NY (US); James G. Ryan, Newtown, CT (US); Richard P. Volant, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 10/053,314

(22) Filed: Jan. 17, 2002

(65) Prior Publication Data

US 2003/0132191 A1 Jul. 17, 2003

(51) Int. Cl.$^7$ .......................... B44C 1/22; C03C 15/00; C23F 1/00
(52) U.S. Cl. .................. 216/2; 216/38; 216/52; 216/88; 216/99; 216/100; 438/756; 438/754; 438/745
(58) Field of Search .................. 216/2, 38, 52, 216/84, 88, 91, 99, 100, 8, 9; 438/739, 745, 754, 756, 757

(56) References Cited

U.S. PATENT DOCUMENTS

| | | |
|---|---|---|
| 4,906,840 A | 3/1990 | Zdeblick et al. |
| 5,116,462 A | 5/1992 | Bartha et al. |
| 5,235,187 A | 8/1993 | Arney et al. |
| 5,302,239 A | 4/1994 | Roe et al. |
| 5,449,903 A | 9/1995 | Arney et al. |
| 5,965,218 A | 10/1999 | Bothra et al. |
| 6,143,583 A | 11/2000 | Hays |
| 6,146,227 A | 11/2000 | Mancevski |
| 6,238,580 B1 | 5/2001 | Cole et al. |

*Primary Examiner*—William A. Powell
(74) *Attorney, Agent, or Firm*—RatnerPrestia; Ira D. Blecker, Esq.

(57) ABSTRACT

A scanning probe microscope probe is formed by depositing probe material in a mold that has a cavity in a shape and of a size of the desired form of the scanning probe microscope probe that is being fabricated. In the preferred embodiment, the cavity is formed by lithographically defining, in the body of the mold, the shape and the size of the desired scanning probe microscope probe and etching the body of the mold to form the cavity. Prior to depositing the probe material in the cavity in the mold, the cavity is lined with a release layer which, upon activation after the probe has been formed, permits removal of the probe.

20 Claims, 2 Drawing Sheets

METHOD FOR FABRICATING A SCANNING PROBE MICROSCOPE PROBE

TECHNICAL FIELD

The present invention relates, in general, to probes of scanning probe microscopes and, in particular, to a method of making such probes.

BACKGROUND OF THE INVENTION

Scanning probe microscopes, such as atomic force microscopes and scanning capacitance microscopes examine samples and provide information about the nature, characteristics, and structure of the samples that are being examined. An atomic force microscope, for example, provides information about the topography of a sample under investigation. A scanning capacitance microscope, for example, provides information about the electrical characteristics, such as the charge distribution, of the sample under investigation.

In scanning probe microscopes, a probe senses the property or feature of the sample that is of interest. For example, an atomic force microscope provides a high resolution view of the surface that is being imaged. The choice of material of the probe and the desired size and shape of the probe are dictated by the information that is of interest and the structure of the sample that is being investigated.

The level of information that can be developed about the nature, characteristics, and structure of a sample under investigation is limited by the size of the probe. For example, with atomic force microscopes, the resolution of the view of the surface being imaged is limited by how small the probe can be made.

There is an ongoing demand for higher and higher resolution probes. This means that there is a demand for smaller and smaller probes.

At the present time, lithography/etching techniques are the most widely used in fabricating the probes of scanning probe microscopes. Starting with the material of choice in bulk form, the desired shape of the probe is defined by lithography and formed by etching.

The lithography/etching techniques that are used to form the probes are reengineered for different probe designs and depend upon the choice of material of the probe and desired shape of the probe that is to be fabricated. The choice of probe material and design of probe shape, in turn, are dependent upon the particular application of the scanning probe microscope. Such reengineering of the lithography/etching technique adds cost to and delays in the fabrication of the probes.

Depending on the size and shape of the probe being fabricated, the lithography/etching process might be followed with ion milling to provide the finishing touches to the probe. Ion milling involves directing a high energy beam of ions to the probe to form the desired final shape of the probe. The additional step of ion milling adds to the cost and time required to fabricate the probe.

In addition, materials of choice for scanning probe microscope probes are not always readily available in bulk form. Consequently, other, less suitable, materials often are substituted in the fabrication of the probes or fabrication of the probes might be delayed undesirably.

SUMMARY OF THE INVENTION

It is an objective of the present invention to provide a new and improved method for fabricating a scanning probe microscope probe.

It is another objective of the present invention to provide a method by which a scanning probe microscope probe can be fabricated in a cost effective manner.

To achieve these and other objectives, a method for fabricating a scanning probe microscope probe in accordance with the present invention includes the steps of providing a mold having, in the body of the mold, a cavity in a shape and of a size of a desired form of a scanning probe microscope probe and lining the cavity with a release layer. A probe material is deposited in the cavity over the release layer to form a scanning probe microscope probe and the release layer is activated to release the scanning probe microscope probe from the cavity.

BRIEF DESCRIPTION OF THE DRAWING

The present invention is best understood from the following detailed description when read in conjunction with the accompanying drawings.

DETAILED DESCRIPTION OF THE INVENTION

Figure 1:
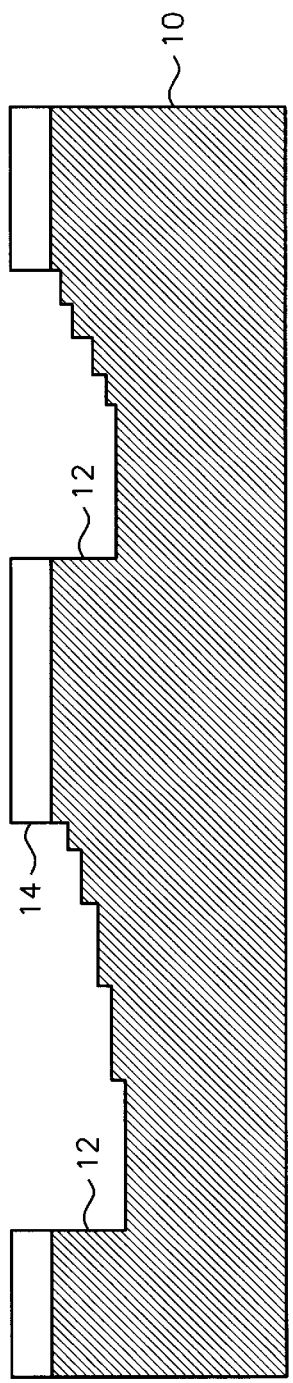
FIG. 1 is a profile view of one embodiment of a mold in which a scanning probe microscope probe can be fabricated in accordance with the present invention.

Referring to FIG. 1, a method for fabricating a scanning probe microscope probe, according to the present invention, includes the step of providing a mold 10 having, in the body of the mold, a cavity 12 in a shape and of a size of a desired form of a scanning probe microscope probe. The mold 10 of FIG. 1 is shown as having two cavities 12 of different sizes to indicate that more than one scanning probe microscope probe of different forms and sizes can be fabricated in one run in accordance with the present invention.

For the embodiment of the present invention illustrated by the drawings and being described, the scanning probe microscope probe to be fabricated is stepped. It will be understood that other forms of scanning probe microscope probes, for example probes having slopes rather than steps, can be fabricated by the present invention. To a great extent, the shape of the scanning probe microscope probe is dependent upon the size of the required tip, which can be very small, for example less than 0.1 μm.

The body of mold 10 preferably is an insulator material, such as silicon, and can be formed by growing, spinning, chemical vapor deposition, ionized physical vapor deposition and sputtering or obtained in bulk form.

Cavity 12 in mold 10 preferably is formed by lithographically defining, in the body of the mold, the shape and the size of the desired scanning probe microscope probe and etching the body of the mold to form the cavity. In this process, known as reactive ion etching, a layer 14 of photoresist is used in forming cavity 12 as shown in FIG. 1. Photoresist, used in forming step shaped cavity 12, is not shown in FIG. 1 because it has been removed to form the cavity. Eventually, all of photoresist layer 14 is removed as shown in FIG. 2.

As indicated above, scanning probe microscope probes fabricated in accordance with the present invention can take various forms, shapes and sizes. For a step shaped probe formed by the step shaped cavity 12 that is illustrated, the method steps of lithographically defining the mold cavity and forming the mold cavity by etching would be repeated to form the step shaped cavity.

Figure 2:
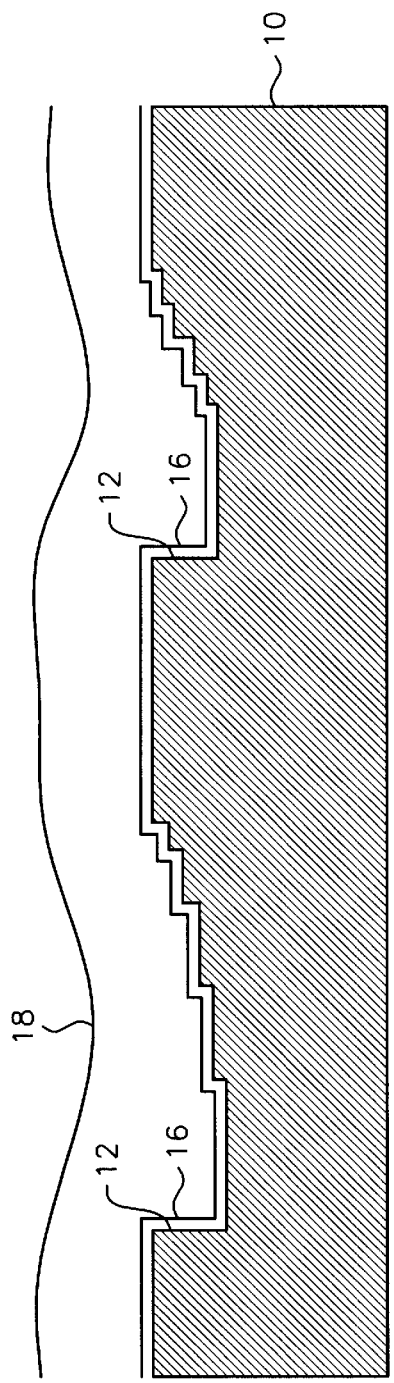
FIG. 2 is a profile view of a stage in the fabrication of a scanning probe microscope probe in the FIG. 1 mold.

After cavity 12 is formed and photoresist layer 14 is removed, cavity 12 is lined with a release layer 16 as shown in FIG. 2. Upon subsequent activation of release layer 16, after the scanning probe microscope probe has been formed, the probe can be removed from cavity 12. It should be noted that, for the embodiment of the present invention being described, release layer 16 is applied over the surfaces within mold 10 and over the surfaces of the mold outside cavity 12 (i.e., the top surfaces of the mold between the cavities). In certain implementations of the present invention, those portions of release layer 16 applied to mold 10 outside cavity 12 are simply the result of applying the release layer to the mold on a non-selective basis with the primary interest being to apply the release layer to the surfaces within the cavity. In other implementations of the present invention, release layer 16 is applied to the surfaces of mold 10 outside cavity 12 for a specific purpose that is described below.

When fabricating a scanning probe microscope probe, in accordance with the present invention, from a metal, such as nickel, or from a metal alloy, such as a nickel/gold alloy, release layer 16 can be composed of a number of layered components, such as tantalum nitride, tantalum, and copper that together form a liner/barrier/adhesion/seed layer. When fabricating a scanning probe microscope probe, in accordance with the present invention, from an insulator, such as silicon nitride or silicon oxide, release layer 16 can be an organic material, such as the commercially available, low dielectric constant, silicon product that is known as SiLK (SiLK is a trademark of Dow Chemical Co., Midland, Mich.). The composition and functioning of release layer 16 will be considered in further detail below.

After cavity 12 is lined with release layer 16, a probe material 18 is deposited in the cavity over the release layer to form a scanning probe microscope probe. The step of depositing probe material 18 can be performed, for example, by chemical vapor deposition, electroplating or electroless plating when the probe material is a metal, such as nickel, or a metal alloy, such as a nickel/gold alloy. When the probe material is an insulator, such as silicon nitride or silicon oxide, the step of depositing probe material 18 can be performed, for example, by chemical vapor deposition.

Figure 3:
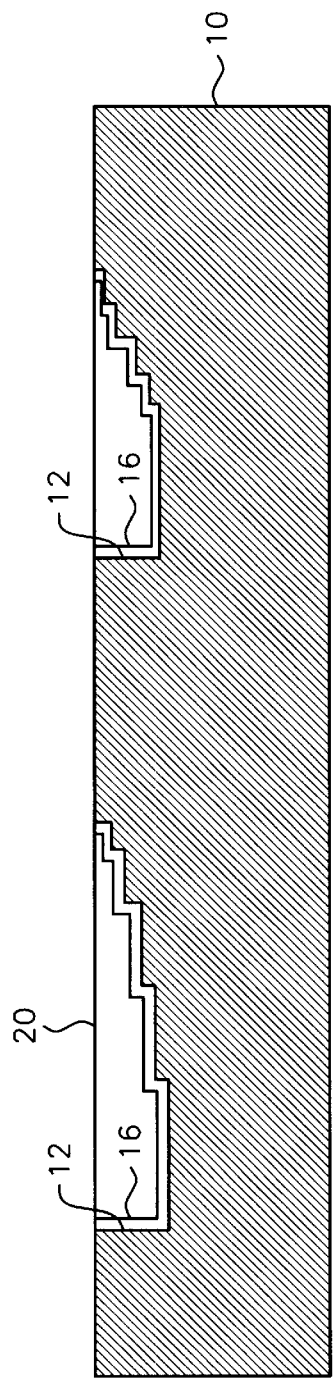
FIG. 3 is a profile view of a later stage in the fabrication of a scanning probe microscope probe in the FIG. 1 mold.

As shown in FIG. 2, cavity 12 can be overfilled with probe material 18. In accordance with the present invention, this excess probe material outside cavity 12 is removed to form a planar surface 20 on the scanning probe microscope probe as shown in FIG. 3. The excess probe material 18 outside cavity 12 preferably is removed by chemical mechanical polishing to form planar surface 20 on the scanning probe microscope probe.

Figure 4:
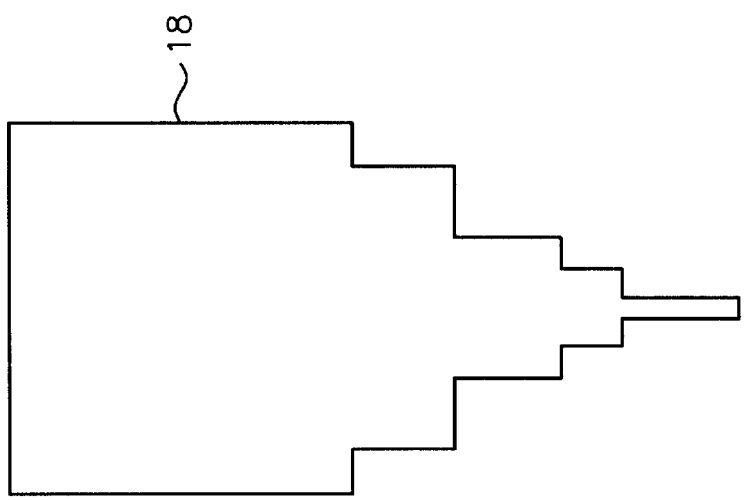
FIG. 4 is a side view of a scanning probe microscope probe fabricated in accordance with the embodiment of the present invention illustrated by FIGS. 1, 2, and 3.

After the scanning probe microscope probe has been formed in cavity 12, release layer 16 is activated to release the scanning probe microscope probe from the cavity. The released scanning probe microscope probe is shown in FIG. 4.

Figure 5:
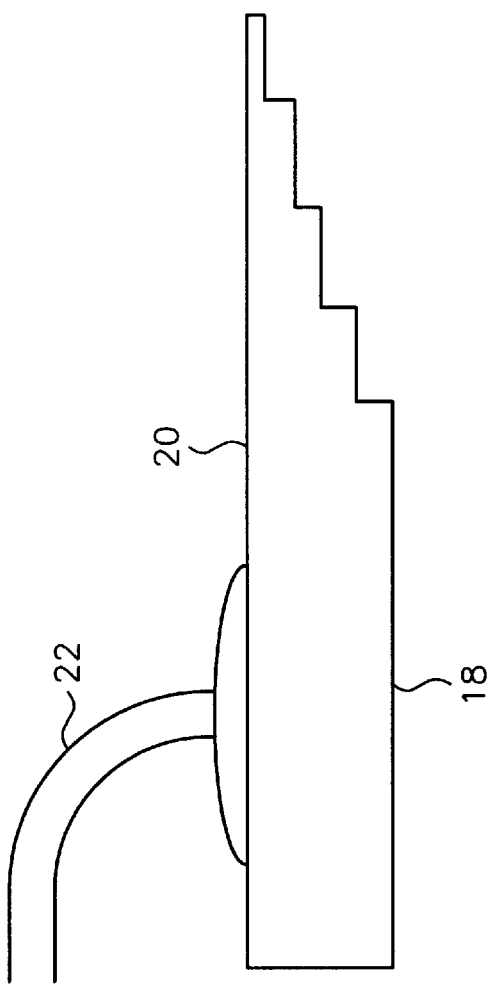
FIG. 5 is a top view of the FIG. 4 scanning probe microscope probe.

A holding structure 22, shown in FIG. 5, is provided by which the scanning probe microscope probe can be mounted in a scanning probe microscope. FIG. 5 shows the holding structure 22 attached to planar surface 20 of the scanning probe microscope probe, preferably by wirebonding.

When release layer 16 is, for example, a liner/barrier/adhesion/seed layer of tantalum nitride, tantalum, and copper, the copper in the release layer is partially etched away by the chemical mechanical polishing to partially release the scanning probe microscope probe from cavity 12. Partial release, as used herein, means that the step of completely releasing the scanning probe microscope probe from mold 10 has commenced but has not been completed. The etching of the copper of release layer 16 and the full release of the scanning probe microscope probe is completed by placing mold 10, still containing the scanning probe microscope probe, in any of a number an etchant solutions known to those skilled in the art. While copper is the preferred seed material for a release layer 16 that includes other materials, a nickel seed also can be used, in which case a different etchant would be used to fully release the scanning probe microscope probe from mold 10.

It is well known that metals do not normally adhere well to silicon. Consequently, with copper, for example, selected as the seed material of release layer 16 for a scanning probe microscope probe being fabricated in a mold 10 made of silicon, the release layer also includes components that enhance the adhesion of the copper to the silicon and also prevent diffusion of the copper into the silicon. Layers of tantalum nitride and tantalum, for example, are included in release layer 16 for these purposes.

The presence, in the slurry that is applied during chemical mechanical polishing of the probe material, of the reaction product of potassium iodide and iodine (i.e., $KI_3$), for example, starts the process of releasing the scanning probe microscope probe from mold 10 by partially etching away the copper in the release layer. This release process is completed by placing mold 10, still containing the scanning probe microscope probe, in an etchant solution.

To prevent losing the scanning probe microscope probe in the etchant solution during completion of the release process, a handle is attached to planar surface 20 of the scanning probe microscope probe before mold 10, still containing the scanning probe microscope probe, is placed in an etchant solution. Holding structure 22, for example, can serve as a part by which the probe can be handled as it is being released completely from mold 10, in which case holding structure 22 is attached to planar surface 20 of the scanning probe microscope before the probe is completely released from the mold. As an alternative, some other part can be attached to the scanning probe microscope probe temporarily for handling of the probe as it is being released completely from mold 10 by the etchant solution and holding structure 22 then can be attached to the probe after the probe has been completely released from the mold.

When release layer 16 is, for example, an organic material, the release layer is activated to release the scanning probe microscope probe by an oxygen plasma. After deposition of probe material 18 and chemical mechanical polishing of the probe material 18, the structure is expose to an oxygen plasma that etches away the organic material release layer. Again, to prevent losing the scanning probe microscope probe during the process of releasing the probe from mold 10, either holding structure 22 is attached to the probe before the release process is started or a temporary handle is attached to the probe before the release process is started which is replaced by the holding structure subsequent to release of the probe from the mold.

As indicated above, one preferred composition of probe material 18 is a nickel/gold alloy. Such an alloy results in a scanning probe microscope probe that has the desired conductivity characteristic of gold and the desired strength characteristic of nickel. With gold as the top or planar surface 20 of the scanning probe microscope probe and the wirebond being gold, the bond between surface 20 of the probe and holding structure 22 will be strong.

When using a metal, such as nickel, or a metal alloy, such as nickel/gold, as the probe material 18, and a tantalum nitride/tantalum/copper liner/barrier/adhesion/seed layer, the deposition of the liner/barrier/adhesion/seed layer 16 preferably is followed by a 30 second–40 second chemical mechanical polishing of those portions of the copper of the release layer applied over surfaces of mold 10 outside cavity 12. This chemical mechanical polishing can be done with a slurry that includes the reaction product of potassium iodide and iodine (i.e., $KI_3$) to remove the seed copper layer from release layer 16 that has been applied to mold 10 outside cavity 12 (i.e., the surfaces between the cavities in the mold), while allowing the remainder of the release layer (i.e., the liner/barrier/adhesion layer) to remain on the surfaces of the mold between the cavities in the mold.

This chemical mechanical polishing of selected portions of release layer 16 can minimize the chemical mechanical polishing that is performed after the probe material 18 has been deposited because the probe material will not be deposited over the release layer 16 where the copper seed had been removed and is especially useful when the probe material is deposited by electroplating because the tantalum nitride/tantalum liner/barrier/adhesion layer can serve as a current carrier but will not plate.

Normally, chemical mechanical polishing of probe material 18 involves at least two actions and chemical constituents. First is the application of an oxidizing material to oxidize the material to be chemical mechanical polished and second is removal of the oxidized material with an abrasive. With gold as the top surface of probe material 18, oxidation is not an option. Rather, chemical mechanical polishing is achieved with the reaction product of potassium iodide and iodine (i.e., $KI_3$) in the slurry that will react the gold forming gold iodide that, with the normal abrasive action, causes the gold to be polished. Next, a nickel/gold plating can be applied as the probe material 18 which afterwards is chemical mechanical polished.

Although illustrated and described herein with reference to certain exemplary embodiments, the present invention, nevertheless, is not intended to be limited to the details shown and described. Rather, various modifications may be made to those exemplary embodiments within the scope and range of equivalents of the claims without departing from the invention.

What is claimed:

1. A method for fabricating a scanning probe microscope probe comprising the steps of:
    providing a mold having, in the body of the mold, a cavity in a shape and of a size of a desired form of a scanning probe microscope probe;
    lining said cavity with a release layer;
    depositing a probe material in said cavity over said release layer to form a scanning probe microscope probe; and
    activating said release layer to release said scanning probe microscope probe from said cavity.

2. A method for fabricating a scanning probe microscope probe according to claim 1 further including the step of removing probe material outside said cavity to form a planar surface on said scanning probe microscope probe prior to completely releasing said scanning probe microscope probe from said cavity.

3. A method for fabricating a scanning probe microscope probe according to claim 2 wherein said probe material outside said cavity is removed by chemical mechanical polishing.

4. A method for fabricating a scanning probe microscope probe according to claim 3 wherein the step of activating said release layer includes:
    (a) activating said release layer to partially release said scanning probe microscope probe during chemical mechanical polishing of said probe material, and
    (b) activating said release layer to completely release said scanning probe microscope probe by placing said mold, still containing said scanning probe microscope probe, in an etchant solution.

5. A method for fabricating a scanning probe microscope probe according to claim 1 wherein:
    (a) the step of providing said mold includes:
        (1) lithographically defining, in said body of said mold, the shape and the size of the desired scanning probe microscope probe, and
        (2) etching said body of said mold to form said cavity, and
    (b) said probe material is deposited in said cavity by one of chemical vapor deposition, electroplating and electroless plating when said probe material is a metal.

6. A method for fabricating a scanning probe microscope probe according to claim 1 wherein:
    (a) the step of providing said mold includes:
        (1) lithographically defining, in said body of said mold, the shape and the size of the desired scanning probe microscope probe, and
        (2) etching said body of said mold to form said cavity, and
    (b) said probe material is deposited in said cavity by chemical vapor deposition when said probe material is an insulator.

7. A method for fabricating a scanning probe microscope probe according to claim 1 further including the steps of:
    (a) forming a planar surface on said scanning probe microscope probe prior to completely releasing said scanning probe microscope probe from said cavity,
    (b) providing a holding structure by which said scanning probe microscope probe can be mounted in a scanning probe microscope, and
    (c) attaching said holding structure to said planar surface of said scanning probe microscope probe prior to completely releasing said scanning probe microscope probe from said cavity.

8. A method for fabricating a scanning probe microscope probe according to claim 1 further including the steps of:
    (a) forming a planar surface on said scanning probe microscope probe prior to completely releasing said scanning probe microscope probe from said cavity,
    (b) providing a holding structure by which said scanning probe microscope probe can be mounted in a scanning probe microscope, and
    (c) attaching said holding structure to said planar surface of said scanning probe microscope probe after completely releasing said scanning probe microscope probe from said cavity.

9. A method for fabricating a scanning probe microscope probe according to claim 8 further including the steps of:
    (a) providing a handle,
    (b) attaching said handle to said planar surface of said scanning probe microscope probe prior to completely releasing said scanning probe microscope probe from said cavity, and (c) removing said handle from said planar surface of said scanning probe microscope probe after completely releasing said scanning probe microscope probe from said cavity and before attaching said holding structure to said planar surface of said scanning probe microscope probe.

10. A method for fabricating a scanning probe microscope probe according to claim 1 wherein said cavity is overfilled with said probe material and said method further includes the steps of:

(a) removing probe material outside said cavity to form a planar surface on said scanning probe microscope probe, (b) providing a holding structure by which said scanning probe microscope probe can be mounted in a scanning probe microscope, and (c) attaching said holding structure to said planar surface of said scanning probe microscope probe.

11. A method for fabricating a scanning probe microscope probe according to claim 10 wherein said probe material outside said cavity is removed by chemical mechanical polishing and said planar surface on said scanning probe microscope is formed by chemical mechanical polishing.

12. A method for fabricating a scanning probe microscope probe according to claim 11 wherein said release layer is:

(a) partially etched away by said chemical mechanical polishing to partially release said scanning probe microscope probe from said cavity, and (b) completely etched away by an etchant solution to completely release said scanning probe microscope probe from said cavity.

13. A method for fabricating a scanning probe microscope probe according to claim 2 wherein said release layer is an organic material.

14. A method for fabricating a scanning probe microscope probe according to claim 13 wherein said release layer is activated by an oxygen plasma to completely release said scanning probe microscope probe from said cavity.

15. A method for fabricating a scanning probe microscope probe according to claim 2 wherein said release layer includes a copper layer as a top layer and the step of lining said cavity with said release layer includes:

(a) applying said release layer over surfaces within said cavity and over surfaces of said mold outside said cavity, and (b) chemical mechanical polishing of said release layer over surfaces of said mold outside said cavity with a reaction product of potassium iodide and iodine to remove said copper layer of said release layer applied over surfaces of said mold outside said cavity, while allowing the remainder of said release layer over surfaces of said mold outside said cavity to remain over surfaces of said mold outside said cavity.

16. A method for fabricating a scanning probe microscope probe according to claim 2 wherein said step of providing a mold includes forming said mold body by one of growing, spinning, chemical vapor deposition, ionized physical vapor deposition and sputtering of an insulator material.

17. A method for fabricating a scanning probe microscope probe according to claim 15 wherein said release layer further includes a layer of tantalum nitride and a layer of tantalum between said layer of tantalum nitride and said layer of copper.

18. A method for fabricating a scanning probe microscope probe according to claim 2 wherein:

(a) said probe material outside said cavity is removed by chemical mechanical polishing and said planar surface on said scanning probe microscope probe is formed by chemical mechanical polishing, (b) said release layer is:
(1) partially etched away by said chemical mechanical polishing to partially release said scanning probe microscope probe from said cavity, and
(2) completely etched away by an etchant solution to completely release said scanning probe microscope probe from said cavity, and (c) said probe material is nickel.

19. A method for fabricating a scanning probe microscope probe according to claim 2 wherein:

(a) said probe material outside said cavity is removed by chemical mechanical polishing and said planar surface on said scanning probe microscope probe is formed by chemical mechanical polishing, (b) said release layer is:
(1) partially etched away by said chemical mechanical polishing to partially release said scanning probe microscope probe from said cavity, and
(2) completely etched away by an etchant solution to completely release said scanning probe microscope probe from said cavity, and (c) said probe material is a nickel/gold alloy.

20. A method for fabricating a scanning probe microscope probe according to claim 2 wherein:

(a) said release layer is activated by an oxygen plasma to completely release said scanning probe microscope probe from said cavity, and (b) said probe material is one of silicon nitride and silicon oxide.

* * * * *